Feb. 18, 1958    P. A. MARSAL    2,824,165
DUPLEX ELECTRODES
Filed Nov. 17, 1953
Plastic Matrix With
Electronegative Particles
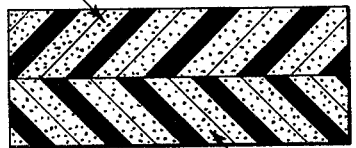
Plastic Matrix With
Electropositive Particles
*INVENTOR.*
PAUL A. MARSAL
BY
*ATTORNEY*

2,824,165
DUPLEX ELECTRODES

Paul A. Marsal, Rocky River, Ohio, assignor to Union Carbide Corporation, a corporation of New York Application November 17, 1953, Serial No. 392,750

12 Claims. (Cl. 136—122)

This invention relates to electrodes for use in primary batteries of the flat type; that is to say, those in which an electrode is used for a dual purpose, as the cathode for one cell, and as the anode for the adjacent cell.

The primary advantage of cells having the flat type of construction as compared with cells of the cylindrical type, is the saving in space when numerous cells are assembled to form a battery, as duplex electrodes render unnecessary a separate connection from cell to cell in a battery. In addition, as the anodic material is not the cell container, but serves only for the chemical reaction, there is a great saving in the quantity of it required by flat cells.

Conventionally, electrodes of this type are fabricated by brushing, spraying or painting a zinc electrode with multiple coats of a carbon-laden paint, the carbon being in the form of colloidal graphite, acetylene black or carbon black; each coat being baked to evaporate the solvent before the next one is applied. This coating must possess the following properties. It must be absolutely impermeable to electrolyte. It must be a conductor of electricity, and not be too high in resistance. It must not be soluble or disintegrate in the presence of dry sealing compounds. It must adhere well to the metal, and not be dislodged when the sheet of anodic material is punched or cut. It must be sufficiently elastic so as not to crack or have its protecting quality impaired by slight bending of the metal. Its properties must not change on aging. While the prior art indicates the existence of coatings having some of these attributes, the results obtained with them have not been entirely satisfactory, and the problem of finding a combination product embodying all the above-indicated properties appears insurmountable. Further, the present methods of producing duplex electrodes are of limited application, as suitable adhesion of carbon-filled paints to metals more chemically reactive than zinc is not thereby feasible. Solvent cost also renders this method uneconomical in particular cases.

It is accordingly an object of this invention to eliminate solvent difficulties encountered in constructing electrodes of this type.

It is another object of this invention to furnish a duplex electrode of such construction as to permit the use of more reactive metals than are commonly employed in such material.

Further and more detailed objects of the invention will be apparent as the description thereof proceeds. The single drawing accompanying said description is a front elevational view of a duplex electrode made in accordance with the invention.

Essentially, the novelty of this invention lies in the fact that a high heat resistant thermoplastic powder, molded under heat and pressure, is used to form a common matrix bonding together anodic and cathodic materials. The present invention, therefore, departs from conventional methods of producing duplex electrodes, in that no solvent of any sort is utilized in their fabrication.

The amount of plastic binder employed in the electrode construction of this invention is maintained as small as possible, commensurate with securing reasonable mechanical strength, but ease of molding and maximum utilization of reactive materials are the primary considerations in determining the amount of the respective constituents used. The ratios selected for the preferred embodiments of this invention may be said to consist between 75% and 98% electro-negative material for the negative side of the electrode, and 80% to 95% of the electro-positive material for the cathodic side of the electrode; the remainder in each case consisting of a thermoplastic resin. Whenever greater ease of molding is desired, larger quantities of the resin may, of course, be used, as long as this amount does not interfere with the electro-conductivity of the finished electrode. While particle size of the metal is not critical, it is generally convenient to employ powders of such a size that they will pass through a 40 mesh (0.417 mm.) screen, while being retained on a 170 mesh (0.088 mm.) screen with the resin particles being of approximately the same size.

The dry-mixed, blended, mixture is compressed in conventional manner under suitable conditions of elevated temperature and pressure. Dependent upon the plastic binder used, the temperature should be at least 200° F. The pressure applied, which is in part dependent upon the quantity of resin in the mixture, should be at least 900 pounds per square inch in the formation of the first side of the electrode, and substantially higher in the compression of the composite electrode material.

As an example of the practice of this invention, a magnesium-graphite duplex electrode was molded using polyethylene powder as a common binder to hold the anodic and cathodic layers in intimate contact. This was accomplished according to the following procedure: 3.80 grams of powdered magnesium metal, and 0.2 gram of finely divided polyethylene powder were mixed in a ceramic jar, and rotated for one hour at 60 to 100 rotations per minute at an angle of 30° to 45° from the horizontal. This mixture was forced by means of a plunger into a suitable mold having a cavity of $15/16$ of an inch in diameter, and maintained at a temperature of 300° F. After compressing this first mix under a pressure of 900 pounds per square inch, the plunger was removed from the mold, and 0.5 gram of a second mixture blended as above, and consisting of 20% polyethylene powder and 80% graphite was placed in the mold, and molded at a pressure of 4,000 pounds per square inch at 300° F. to form the graphite side of the electrode.

Duplex electrodes employing any suitably related, finely divided, electro-motive metals can be made in this manner, as for example one consisting of polyethylene-bonded zinc powder on one side, with polyethylene-bonded copper powder on the other side.

While the foregoing examples of this invention specifically cite polyethylene as the bonding material, the invention is not to be construed as limited solely to the use of this compound, for, in addition to polyethylene, polyvinyl chloride, diphenyl resins, vinyl resins, mixtures thereof, and other similar powdered resins having low water vapor transmission, high gas permeability and good thermal resistance, are also suitable for use in the practice of this invention.

Duplex electrodes of any desired shape and size may be constructed in this manner. Thus electrodes suitable for use in air depolarized cells may be fabricated by incorporating an entry port for air in the electrode construction. In addition, the method of this invention is especially attractive in the construction of electrodes for such cells, as certain resins like polyethylene may be used, which have selective oxygen transmission, and are substantially electrolyte-repellent. Similarly, electrodes of this type can be used advantageously in alkaline batteries such as mercuric oxide cells, where it is desired to effect an electrode contact between the internal anodic material and the non-reactive metal, which provides external contact to the cells.

By the present invention, an improved duplex electrode is provided, being superior over presently employed electrodes of this type in that it employs no solvent of any sort, and permits the use of more reactive metals than are usually found incorporated in these electrodes.

It will be understood that various modifications and variations may be effected without departing from the scope of the appended claims.

I claim:

1. A method of producing duplex electrodes for primary galvanic cells, comprising intimately mixing a finely divided electro-negative material with a thermoplastic resin; said electro-negative material being present in proportions ranging between 75% and 95% of aforesaid mixture; confining this first mixture in a mold of suitable shape and size; compression molding said mixture under a predetermined pressure, at the molding temperature of the resin; next placing in the same mold a second mixture comprising between 5% and 20% of a thermoplastic resin and 80% to 95% of a finely divided electro-positive material, and compression bonding said second mixture to said first compressed mixture under a substantially higher pressure at the molding temperature of the resin.

2. In the method of claim 1, the improvement consisting in using a thermoplastic resin selected from the group consisting of polyvinyl chloride and polyethylene.

3. A method of producing dry cell duplex electrodes, comprising intimately mixing finely divided electro-negative materials with a thermoplastic resin; said electro-negative materials being present in proportions ranging between 75% and 95% of aforesaid mixture; confining this first mixture in a mold of suitable shape and size; compression molding this mixture under a pre-determined pressure at the molding temperature of the resin; next placing in the same mold a second mixture comprising between 5% and 20% of the above resin, and between 80% and 95% of a finely divided electro-positive material; and compression bonding said second mixture to said first compressed mixture under a substantially higher pressure at the molding temperature of this resin.

4. A method of producing duplex electrodes for primary galvanic cells, comprising mixing the finely divided negative active material with a thermoplastic resin; said material being present in proportions ranging between 75% and 98% of said mixture; confining this first mixture in a mold of suitable shape and size; molding said mixture at the molding temperature of the resin under a pressure less than 1,000 pounds per square inch; placing in the same mold a second mixture comprising between 5% and 20% of a thermoplastic resin, and between 80% and 95% of a finely divided electro-positive material, and compressing said second mixture to said first compressed mixture at the molding temperature of the resin under a pressure ranging from 1,000 pounds to 7,000 pounds per square inch.

5. A self-supporting duplex electrode for primary galvanic cells, comprising a thermoplastic resin binder, said binder being present in an amount sufficient to constitute a substantially continuous common matrix supporting both finely divided electro-negative and finely divided electro-positive reactive materials in different electrically conductive contiguous bonded layers.

6. A self-supporting zinc-carbon duplex electrode for primary galvanic cells, comprising a thermoplastic resin binder, said binder being present in an amount sufficient to constitute a substantially continuous common matrix supporting both finely divided electro-positive and finely divided electro-negative reactive materials in different electrically conductive contiguous bonded layers.

7. A self-supporting zinc-copper duplex electrode for primary galvanic cells, comprising a thermoplastic resin binder, said binder being present in an amount sufficient to constitute a substantially continuous common matrix supporting both finely divided electro-negative and finely divided electro-positive reactive materials in different electrically conductive contiguous bonded layers.

8. A self-supporting magnesium-carbon duplex electrode for primary galvanic cells, comprising a thermoplastic resin binder, said binder being present in an amount sufficient to constitute a substantially continuous common matrix supporting both finely divided electro-negative and finely divided electro-positive reactive materials in different electrically conductive contiguous bonded layers.

9. A primary galvanic cell duplex electrode, comprising a first layer formed from a mixture containing from 75% to 98% of an electro-negative material, the remainder of said mixture being a thermoplastic resin, and the same mixture being compression molded to a second layer formed from a mixture containing from 80% to 95% of an electro-positive material; the balance being a thermoplastic resin.

10. A primary dry cell duplex electrode comprising a first layer formed from a mixture containing from 75% to 98% of finely divided zinc metal; the remainder being a thermoplastic resin, compression molded to a second layer formed from a mixture containing from 80% to 95% of comminuted carbonaceous particles; the balance being a thermoplastic resin.

11. A primary dry cell duplex electrode comprising a first layer formed from a mixture containing from 75% to 98% of finely divided zinc metal; the remainder being a thermoplastic resin, compression molded to a second layer formed from a mixture containing from 80% to 95% of finely divided copper metal; the balance being a thermoplastic resin.

12. A primary dry cell duplex electrode comprising a first layer formed from a mixture containing from 75% to 98% of finely divided magnesium metal; the remainder being a thermoplastic resin, compression molded to a second layer formed from a mixture containing from 80% to 95% of finely divided carbonaceous particles; the balance being a thermoplastic resin.

References Cited in the file of this patent

UNITED STATES PATENTS

| 2,649,492 | Linton et al. | Aug. 18, 1953 |
| 2,666,802 | Woodring et al. | Jan. 19, 1954 |
| 2,677,713 | Weil et al. | May 4, 1954 |